US008096176B1

(12) United States Patent
Mayers et al.

(10) Patent No.: US 8,096,176 B1
(45) Date of Patent: Jan. 17, 2012

(54) BIRD DETERRENT FOR SAILBOAT

(76) Inventors: Tom W. Mayers, Longboat Key, FL (US); William E. Mouzavires, Oakton, VA (US)

( * ) Notice: Subject to any disclaimer, the term of this patent is extended or adjusted under 35 U.S.C. 154(b) by 293 days.

(21) Appl. No.: 12/583,621

(22) Filed: Aug. 25, 2009

(51) Int. Cl.
*G01W 1/00* (2006.01)
(52) U.S. Cl. ............... 73/170.03; 73/170.01; 73/170.05
(58) Field of Classification Search .................. None
See application file for complete search history.

(56) References Cited

U.S. PATENT DOCUMENTS

| 6,640,506 | B2 * | 11/2003 | Landers | 52/101 |
| 6,678,979 | B2 * | 1/2004 | Lim et al. | 40/412 |
| 2007/0074467 | A1 * | 4/2007 | Zecher | 52/101 |
| 2008/0163828 | A1 * | 7/2008 | Ingraham et al. | 119/713 |

* cited by examiner

*Primary Examiner* — Andre Allen
(74) *Attorney, Agent, or Firm* — William E. Mouzavires

(57) ABSTRACT

A bird-deterrent device including a hub with fingers radiating from the hub to prevent or inhibit birds from perching on the top of a sailboat mast. In one embodiment, the hub is mounted to the top of a mast by a fastener which also secures a post of a wind indicator having a vane rotatable on the post to indicate wind direction. In another embodiment, the hub is mounted or fixed about the post of the wind indicator. In another embodiment the hub is fixed to a post which is connected to the halyard to be raised above or lowered below the mast.

20 Claims, 3 Drawing Sheets

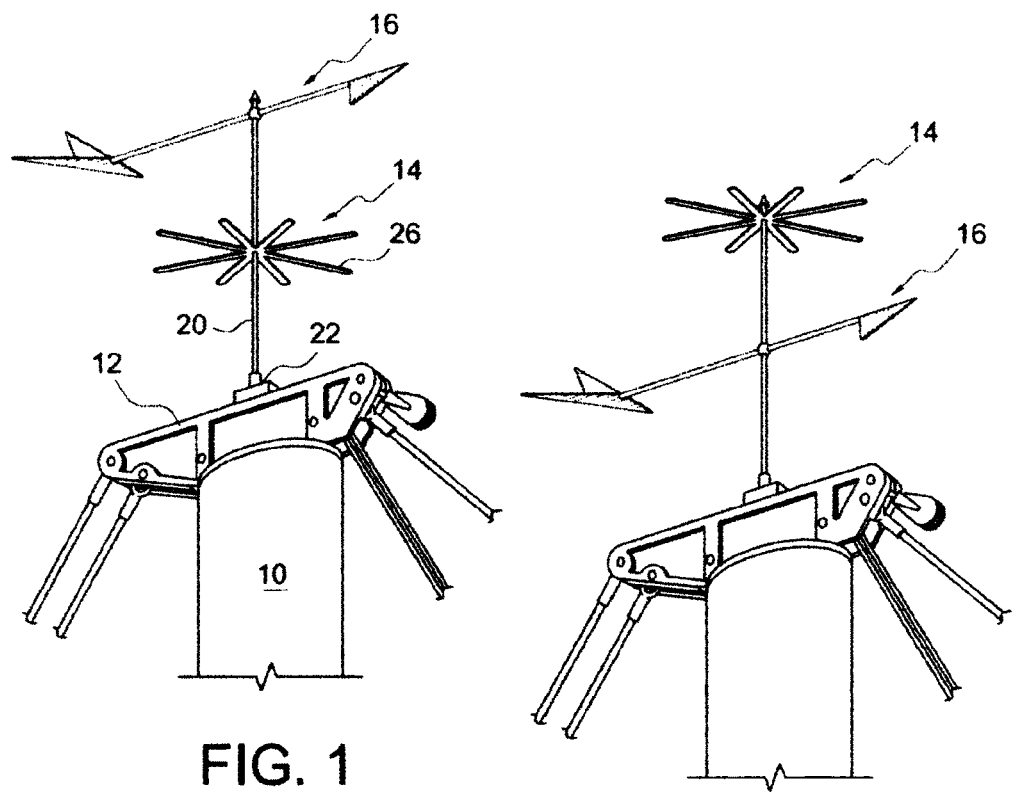
FIG. 1
FIG. 3
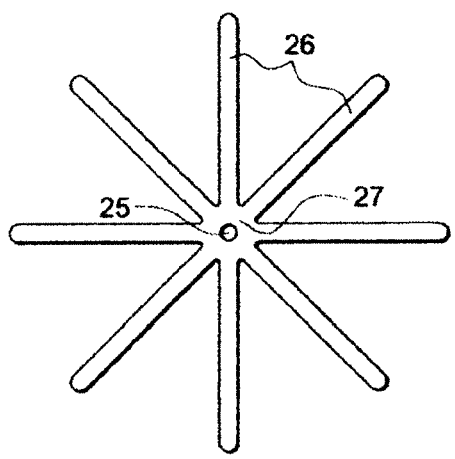
FIG. 2
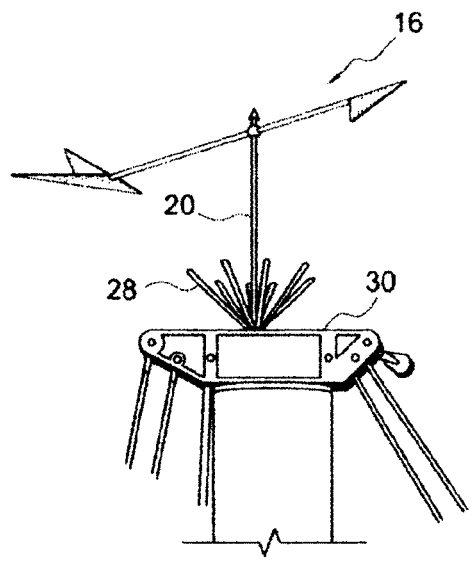
FIG. 4

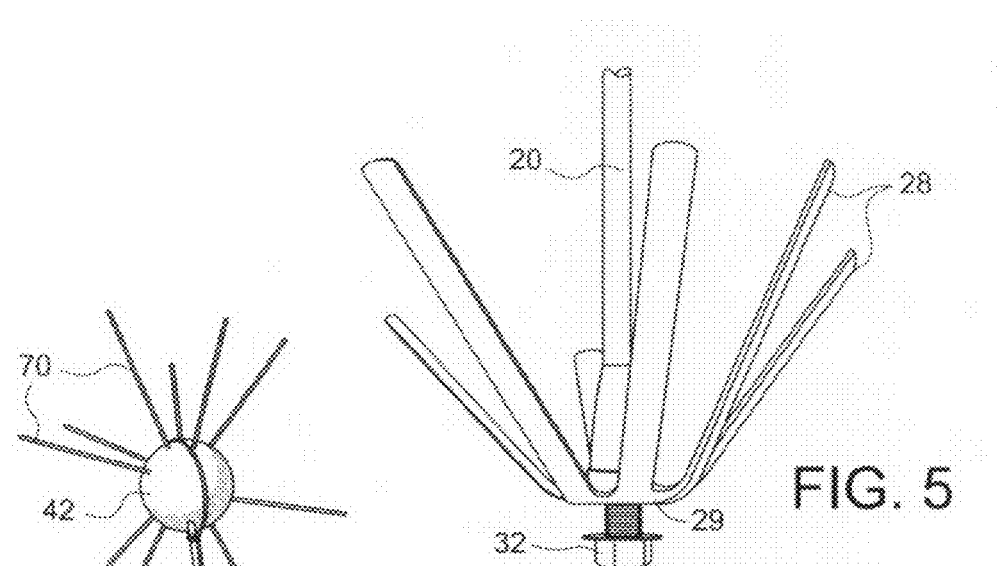
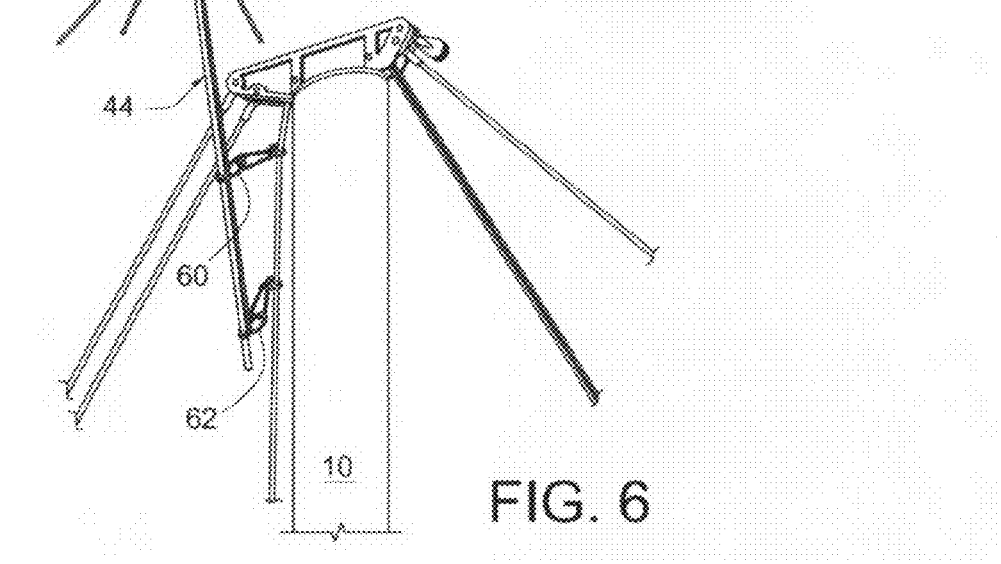
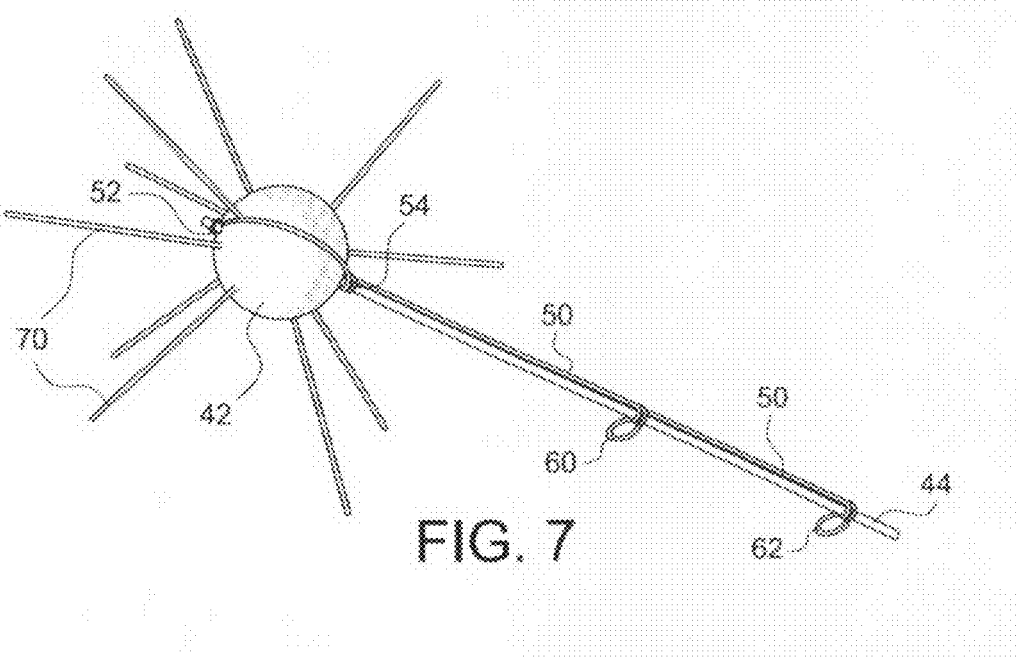

BIRD DETERRENT FOR SAILBOAT

BACKGROUND OF THE PRESENT INVENTION

The present invention relates to a novel and improved bird deterrent device for sailboats. It is well known in the prior art to provide the top of a mast in a sailboat with a device that will inhibit or prevent birds from perching on a mast to eliminate or substantially reduce bird droppings on the boat. Examples of such devices are disclosed, for example, in U.S. Pat. Nos. 5,181,338, 5,615,524, and 6,836,992 B2.

OBJECTS OF THE PRESENT INVENTION

It is an object of the present invention to provide a novel and improved bird-deterrent device for a sailboat. A further object of the present invention is to provide such a bird-deterrent device that may be efficiently combined with a wind indicator for a sailboat.

Another object of the present invention is to promote a bird-deterrent device that may be easily and efficiently mounted to the mast of a sailboat.

Another object is to provide a bird-deterrent device that will be effective to prevent or deter birds from landing or perching on the mast of a sailboat.

A still further object of the present invention is to provide a bird deterrent device for a sailboat that may achieve the above objects and yet may be easily and economically manufactured from available parts, materials and processes.

SUMMARY OF PREFERRED EMBODIMENTS OF THE PRESENT INVENTION

In one preferred embodiment of the present invention, the bird-deterrent device includes a plurality of elongated fingers, prongs, spokes or wires radiating from a hub mounted on or at a post. In one embodiment, the hub is secured to the mast by a fastener which extends through the hub and also secures the post to the top portion of the mast. The fingers radiating from the hub may be stamped or molded, in one piece with the hub, from any suitable metal or plastic or carbon fiber material. In another embodiment of the invention, the hub may be a ball or sphere mounted on the post and with the fingers radiating from the hub.

The hub with its fingers may be located above or below a wind-indicating vane in spaced relation to the former to permit the vane to rotate about the post in response to the wind.

In another preferred embodiment of the present invention, where it is desired to be able to raise and lower the bird deterrent with the halyard, the hub is mounted to a post which is attached to the halyard to be raised or lowered with the halyard. In this form of the invention, the hub is preferably a ball or sphere having radiating fingers. Preferably, the hub is made from penetrable material such as styrofoam and the fingers are rod-like prongs or spokes inserted into the hub at any desired locations. The end of the halyard is connected to the post on one side of the hub so that the post is raised to position the hub with its bird-deterrent fingers above the top of the mast. The hub may be lowered from the top of the mast simply by lowering the halyard.

DRAWINGS

Other objects and advantages of the present invention will become apparent from the following detailed description taken in conjunction with the drawings, in which:

FIG. 1 is an elevational view with some parts shown in perspective of a top section of a sailboat mast incorporating combined bird-deterrent and wind-indicator devices in accordance with the present invention;

FIG. 2 is a plan view of fingers included in the bird-deterrent device;

FIG. 3 is a view similar to FIG. 1 but including an alternative version of the present invention;

FIG. 4 is a perspective view of another version of the present invention;

FIG. 5 is an enlarged perspective view of the bird-deterrent fingers included in the embodiment of FIG. 4;

FIG. 6 is a perspective view of a top section of a sailboat mast incorporating another bird-deterrent device included in the present invention;

FIGS. 7, 8 and 9 are fragmented perspective views of portions of the bird-deterrent device of FIG. 6.

DETAILED DESCRIPTION

Figure 8:
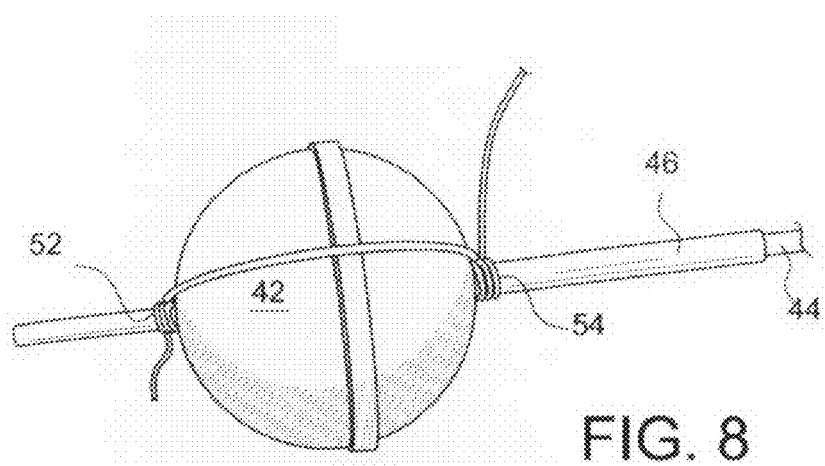

Referring to the drawings in detail there is shown in FIG. 1, for illustrative purposes only, a combined bird-deterrent device 14 and wind indicator 16 constituting one preferred embodiment of the present invention as employed on the top of a mast 10 of a sailboat not shown. This embodiment includes a post 20 fixed to the mast head 12 by a bracket 22 which receives the post 20 and is screwed to the mast head 12. Of course any other suitable means may be used to fix the post 20 to the mast head 12 as, for example, shown in the embodiment of FIGS. 4 and 5.

Referring to FIG. 2, the bird-deterrent device includes a plurality of forgers 26 radially projecting from a hub 27. Although the fingers 26 and the hub 27 are in the same plane, in other embodiments such as shown in FIGS. 4 and 5, the fingers 28 may project at an angle to the plane of the hub 29. In other embodiments, for example, shown in FIGS. 6 and 10, the fingers may project at different angles relative to each other or at different angles from the hub.

Referring to FIGS. 1 and 2, the hub 27 has an aperture 25 receiving the post 20 and is preferably fixed to the post in any suitable manner such as for example opposed nuts or rings fixed on the post and sandwiching the hub 27. However in other embodiments the hub 27 may be rotatable about the post 20. Although in the specific embodiment of FIGS. 1 and 2, the fingers 26 are located on the post 20 below the wind indicator 16, the bird deterrent fingers 26 may be positioned above the wind indicator 16 as shown in FIG. 3. In either embodiment, the length of the post 20 and the location of the bird deterrent device 14 along the post 20 are designed to restrict access to the birds between the mast head 12 and fingers 26 and between the fingers and the wind indicator 16. Additionally the number and length of the fingers 26 are chosen to maximize deterrence but without impairing the free rotation of the wind indicator. In the preferred embodiment of FIGS. 1 and 2, eight fingers 26 equally spaced about hub 27 are employed, but in the embodiment of FIG. 10 the number of fingers are chosen by the user and can be repositioned on the hub as will be further described below.

Referring to FIGS. 4 and 5, there is shown another embodiment of the present invention where the fingers 28 of the bird deterrent device extend upwardly at an angle from the hub 29 rather than being in the same plane as the hub as in the embodiment of FIGS. 1 and 3. Additionally the bird-deterrent device is located at the bottom of the post 20 on the mast head 30. The hub 29 of the deterrent device rests on the mast head 30 and has an aperture which receives a fastener such as screw 32 shown in FIG. 5. Screw 32 extends through the mast head 30, the aperture in the hub 29 and into a bracket 34 which receives the post 20 to fix the post 20 to the mast head. On the top or upper section of the post 20, is a rotatable wind indicator 16 of any suitable type including those existing in the prior art such as the one shown in FIG. 4.

Figure 9:
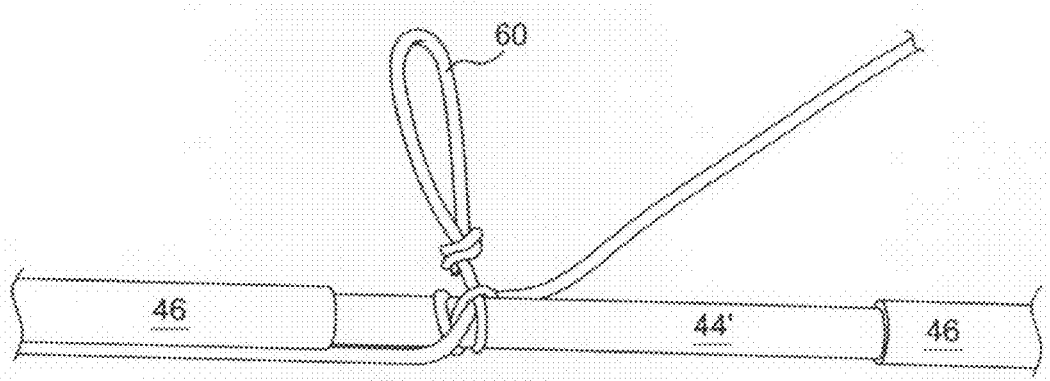

Referring to FIG. 5, there is shown another type of bird-deterrent device in accordance with another present invention that may be raised or lowered above or below the mast 10 by raising or lowering the halyard 40. In this embodiment the deterrent device includes a hub 42 preferably made from a lightweight, penetrable, and/or deformable material such as styrofoam and which may be in the form of a ball or sphere as shown. Hub 42 has a passage extending diametrically therethrough for receiving a post 44 which may be either a single elongated rod or constructed in segments secured together by sleeves 46 as shown in FIGS. 7, 8 and 9 for the purpose of providing a compact assembly of parts in kit form. The post pieces may be made from lightweight wood, plastic or metal rods and the sleeves 46 may be made of similar lightweight material.

In the preferred embodiment shown in FIGS. 6 through 9, the hub 42 is secured on post 44 by a cordage line 50 would around and knotted on the post at 52 and 54 on opposite sides of the hub 42 as shown in FIGS. 7 and 8. Line 50 is then extended along post 44 and formed into knots and loops 60 and 62 shown in FIGS. 7 and 8. The opposite ends of the halyard 40 are connected to the loops 60 and 62 such that the hub 42 may be raised above the mast as shown in FIG. 6 by raising the halyard 40, and may be lowered below the top of the mast by lowering the halyard 40.

In the present embodiment, the deterrent fingers are formed by prongs or spokes 70 which preferably are elongated wood dowels or rods penetrated into the hub 42 in any spaced random or uniform positions as may be chosen by the user. The fingers 70 may be pointed to facilitate penetration into hub 42. When elevated above the mast 10, the fingers 70 will deter birds from perching on the mast head. The deterrent device may be provided in disassembled parts in a kit for retail purposes. The parts would include a styrofoam ball such as float which would be the hub 42; a set of ten or twelve wood dowels which would be prongs 70; a set of wood dowels or rods 44 and plastic sleeves 46 which would form the post; and one heavy duty cordage line 50. Of course the bird-deterrent device can also be provided in a completely assembled form and with other constructions and materials.

Figure 10:
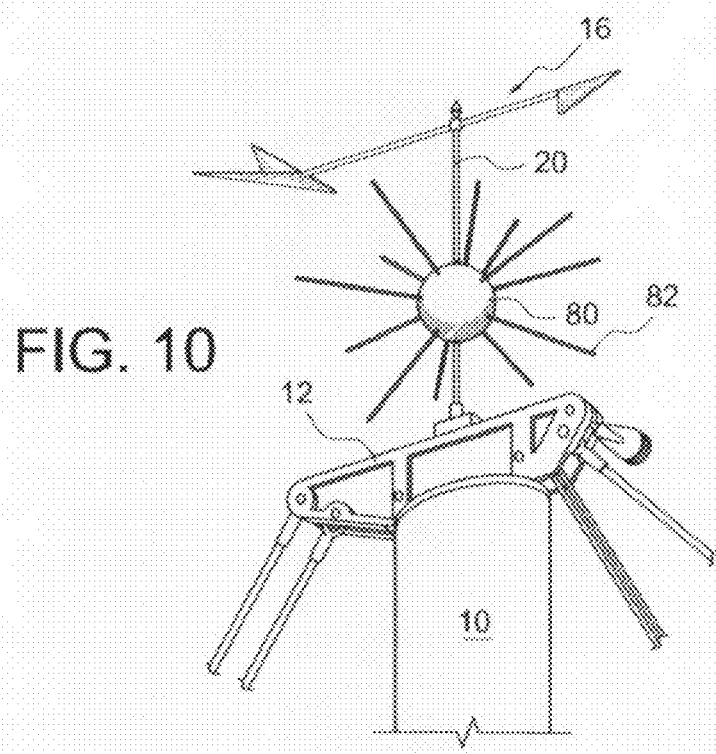
FIG. 10 is a view similar to FIG. 1 but showing another embodiment of the present invention.

Referring now to FIG. 10, there is shown another embodiment of the present invention which is similar to FIG. 1 except that the hub 80 and fingers 82 in the present embodiment are formed in the same manner as that of FIGS. 6 to 9. The hub passage receives the post 20 and the hub 80 is held in fixed position on the post below the wind indicator 16. Any suitable means such as opposed rings 84 or pins (not shown) fixed on the post 20 may be used to hold the hub 80 in fixed position on the post. However in another form (not shown) the hub 80 may be rotatably mounted on post 20. The fingers 82 in the form of wood spokes are easily inserted in the styrofoam hub 8 in any random or uniform position as desired by the user. They may also be easily removed and repositioned on the hub 80.

Although various specific forms of the present inventions have been shown and described above for illustrative purposes, it will be understood that variations of the present inventions will become apparent to those skilled in the art but without departing from the scope of the present inventions indicated in the claims below.

We claim:

1. In combination with a wind indicator for a sailboat, said wind indicator having a post and a vane rotatable on the post, and securement means for securing the post on the mast of a sailboat; a bird deterrent device spaced along said post from said wind indicator and having means for deterring birds from perching on the mast, and wherein said securement means also serves to secure said device to the mast in spaced relation to said vane and wherein said vane is rotatable on said post independently of said bird deterrent device.

2. The combination defined in claim 1 wherein said vane is located above said bird-deterrent device.

3. The combination defined in claim 1 wherein said vane is located below said bird-deterrent device.

4. The combination defined in claim 1 wherein said means for deterring birds includes a hub and a plurality of fingers radiating outwardly from said hub.

5. The combination defined in claim 4 wherein said hub has an aperture receiving said securement means.

6. The combination defined in claim 5 wherein said securement means is a fastener received through the hub and into the bottom of the post.

7. The combination defined in claim 6 wherein said post includes a bracket and said fastener is received in said bracket.

8. The combination defined in claim 4 wherein said hub and fingers are integral with each other.

9. The combination defined in claim 1 wherein said vane has a pointing end portion for indicating direction of the wind.

10. In combination with a wind indicator for sailboat, said wind indicator having a post adapted to be mounted to the mast of a sailboat, and a wind-indicating vane rotatable about the post; a bird-deterrent device mounted on the post independently of said wind indicator and in spaced relation to said vane and having a plurality of fingers projecting outwardly from the post to deter birds from perching on a mast of a sailboat and wherein said vane is rotatable independently of said bird deterrent device.

11. The combination defined in claim 10 wherein said device includes a hub having an aperture receiving said post and said fingers extend outwardly from said hub.

12. The combination defined in claim 11 wherein said hub is rotatable about said post.

13. The combination defined in claim 11 wherein said hub is made from penetrable material and the fingers are secured in the hub by penetration into the hub.

14. The combination defined in claim 11 wherein said hub lies in one plane and said fingers project from said plane at an angle to said plane.

15. The bird-deterrent device defined in claim 10 wherein said hub is made of deformable material and said fingers are pierced into said hub.

16. The combination defined in claim 10 wherein said vane has a pointing end portion for indicating direction of the wind.

17. A bird-deterrent device for a mast of a sailboat comprising in combination, a hub having a plurality of fingers extending outwardly from the hub, a post extending through the hub and projecting from opposite ends thereof, a flexible line extending about the post at the opposite ends of said hub to fix the position of the hub on the post, said line extending along the post below one of said ends of the hub and forming two loops spaced from each other along said post for attaching said post to a halyard of a sailboat to raise or lower the post and the hub together with the halyard.

18. The bird-deterrent device defined in claim 17 wherein said hub is formed of deformable material and said fingers are pierced into the hub.

19. The bird-deterrent device defined in claim 18 wherein said hub is made from styrofoam material.

20. The bird-deterrent device defined in claim 17 wherein said hub is includes a passage extending between said ends of the hub and receiving said post, and wherein said post includes at least two sections and a sleeve interconnecting said sections.

* * * * *